(12) United States Patent
Abukashef

(10) Patent No.: US 9,675,210 B2
(45) Date of Patent: Jun. 13, 2017

(54) FLATBREAD TOASTER

(71) Applicant: Abdalla S. Abukashef, Fort Worth, TX (US)

(72) Inventor: Abdalla S. Abukashef, Fort Worth, TX (US)

( * ) Notice: Subject to any disclaimer, the term of this patent is extended or adjusted under 35 U.S.C. 154(b) by 401 days.

(21) Appl. No.: 14/522,434

(22) Filed: Oct. 23, 2014

(65) Prior Publication Data

US 2015/0114237 A1    Apr. 30, 2015

Related U.S. Application Data

(60) Provisional application No. 61/895,022, filed on Oct. 24, 2013.

(51) Int. Cl.
*A47J 37/08* (2006.01)

(52) U.S. Cl.
CPC .......... *A47J 37/0857* (2013.01); *A47J 37/08* (2013.01); *A47J 37/0835* (2013.01)

(58) Field of Classification Search
USPC ............... 99/331, 332, 327, 385, 389, 391; 426/466; 219/521–525
See application file for complete search history.

(56) References Cited

U.S. PATENT DOCUMENTS

| | | | | |
|---|---|---|---|---|
| 6,192,789 B1 * | 2/2001 | Agcaoili | ............ | A47J 37/0857 99/349 |
| 6,397,732 B1 * | 6/2002 | Jenkins | ............... | A47J 37/0814 99/341 |
| 6,675,700 B2 * | 1/2004 | Hong | .................. | A47J 37/0857 219/492 |
| 6,708,602 B2 * | 3/2004 | Nguyen | ................. | A47J 37/08 99/329 P |
| 6,730,888 B1 * | 5/2004 | Battu | .................... | A47J 37/085 219/502 |
| 7,354,612 B2 * | 4/2008 | Friel, Sr. | ............. | A47J 37/0814 426/233 |
| 7,479,295 B2 * | 1/2009 | Nguyen | .................. | A47J 37/08 426/468 |
| 8,291,813 B2 * | 10/2012 | Leaman | ............. | A47J 37/0814 99/390 |
| 2005/0204927 A1 * | 9/2005 | Boyle | ................. | A47J 37/0857 99/389 |
| 2009/0301313 A1 * | 12/2009 | Leaman | ............. | A47J 37/0814 99/393 |
| 2010/0270282 A1 * | 10/2010 | Fernandez | ................ | F24C 7/06 219/392 |

\* cited by examiner

*Primary Examiner* — Quang D Thanh
*Assistant Examiner* — Renee Larose

(57) ABSTRACT

A flatbread toaster is an apparatus that is utilized to toast flatbread. Flatbreads of various sizes are toasted within a plurality of toasting slot assemblies. The flatbread toaster features an expandable slot assembly that is capable of accommodating and cooking additional types and sizes of food as well. The expandable slot assembly includes a translating wall that may be moved in order to adjust the size of the expandable slot assembly. The flatbread toaster is regulated through a plurality of physical inputs located on a control panel that allows the user to provide commands. User commands provided through the plurality of physical inputs are processed by a computing unit. Heat is provided to cook food via a plurality of heating elements within each of the plurality of toasting slot assemblies and a first heating element and a second heating element within the expandable slot assembly.

20 Claims, 14 Drawing Sheets

FLATBREAD TOASTER

The current application claims a priority to the U.S. Provisional Patent application Ser. No. 61/895,022 filed on Oct. 24, 2013.

FIELD OF THE INVENTION

The present invention relates generally to an apparatus for cooking various types of food. More specifically, the present invention is a flatbread toaster with multiple slots as well as an adjustable slot for accommodating numerous types of food.

BACKGROUND OF THE INVENTION

One of the most common devices for cooking and preparing foods is the toaster. Toasters are utilized to brown bread and are convenient for people who enjoy their bread and sandwiches warmed and crisped. Toasters are available in three primary variants including the pop-up toaster, the toaster oven, and the conveyor belt toaster. While these toasters are highly effective for toasting sandwich breads such as sliced bread and sub rolls, the toasters are for the most part intended for toasting sandwich breads only. The toasters are not practical for toasting other types of bread, specifically flatbread. There is a wide variety of flatbread available including pita bread, khubz, and tortillas. Because of the properties that are unique to flatbread and not shared with most other types of bread, flatbread must generally be toasted in a different manner.

The present invention is a flatbread toaster with multiple slots as well as an expandable slot for cooking various types of foods in addition to flatbreads. The expandable slot may be expanded in order to accommodate larger sizes of breads and other types of foods. The flatbread toaster features multiple control inputs as well as output displays for the user.

DETAIL DESCRIPTIONS OF THE INVENTION

All illustrations of the drawings are for the purpose of describing selected versions of the present invention and are not intended to limit the scope of the present invention.

Figure 1:
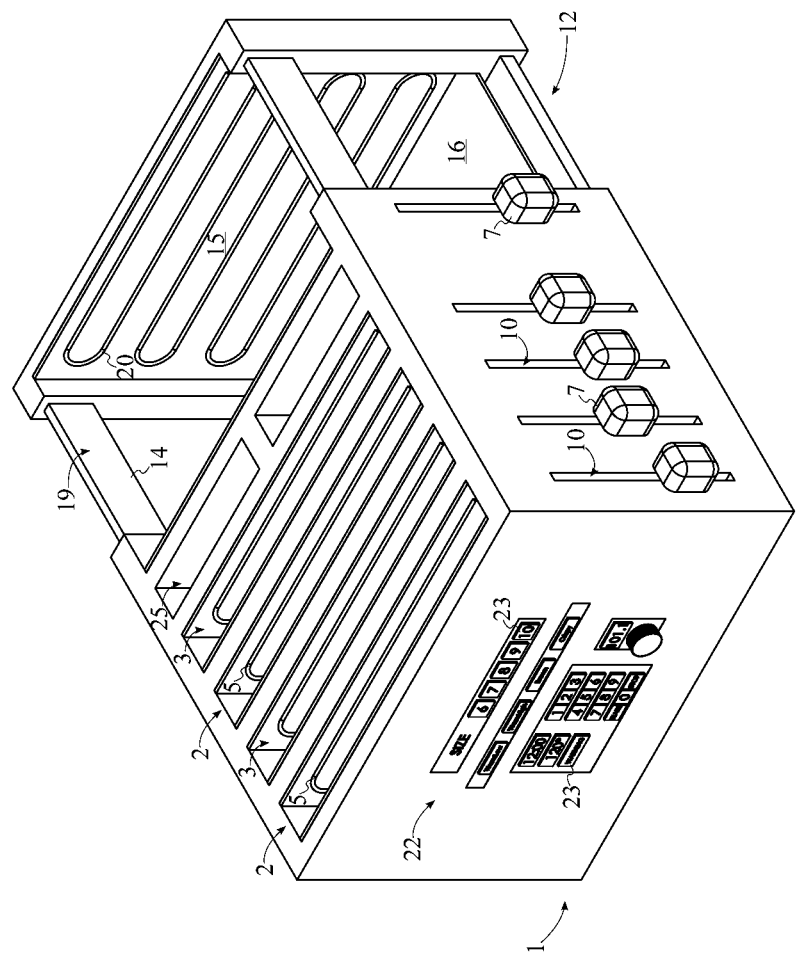
FIG. 1 is a perspective view of the present invention in an expanded configuration.
Figure 2:
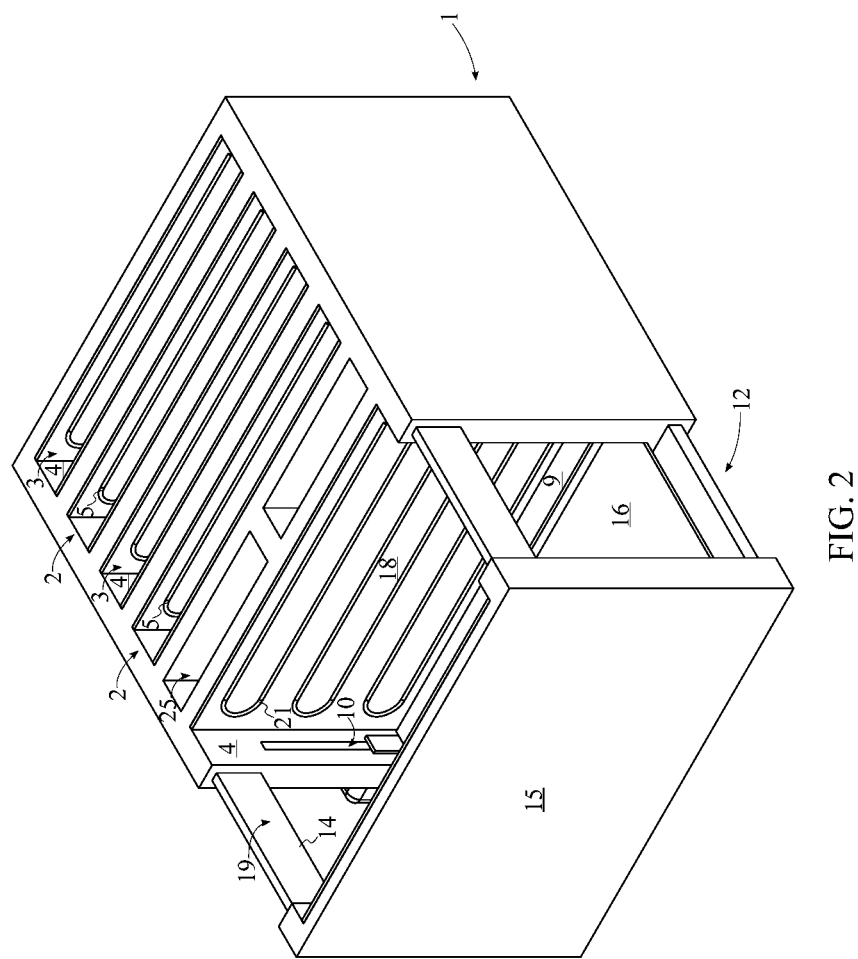
FIG. 2 is an alternative perspective view of the present invention.
Figure 3:
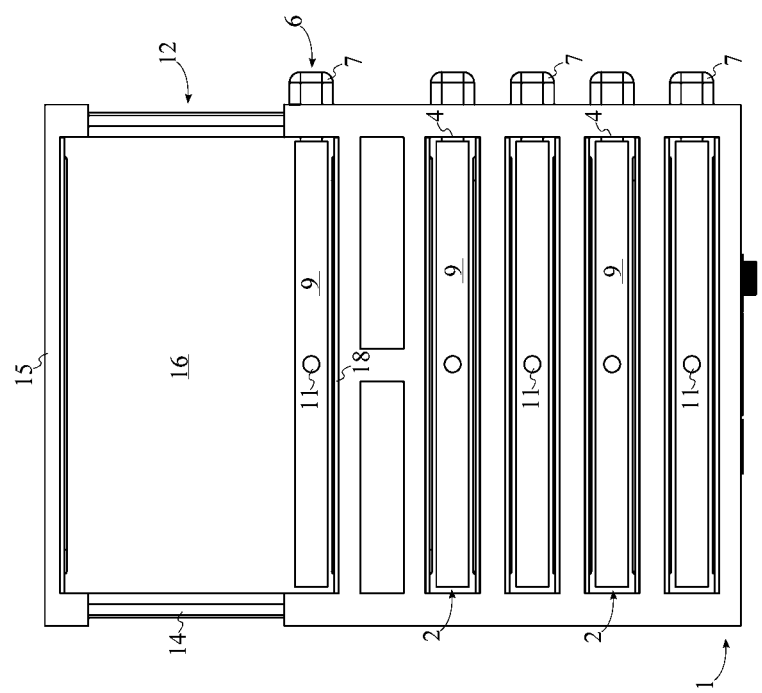
FIG. 3 is a top view of the present invention.
Figure 4:
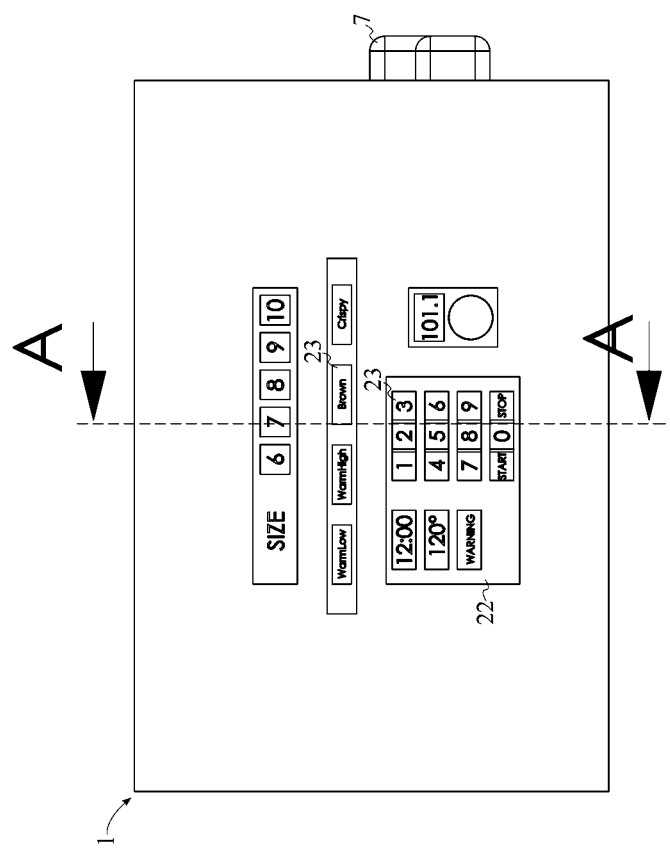
FIG. 4 is a front view of the present invention.
Figure 5:
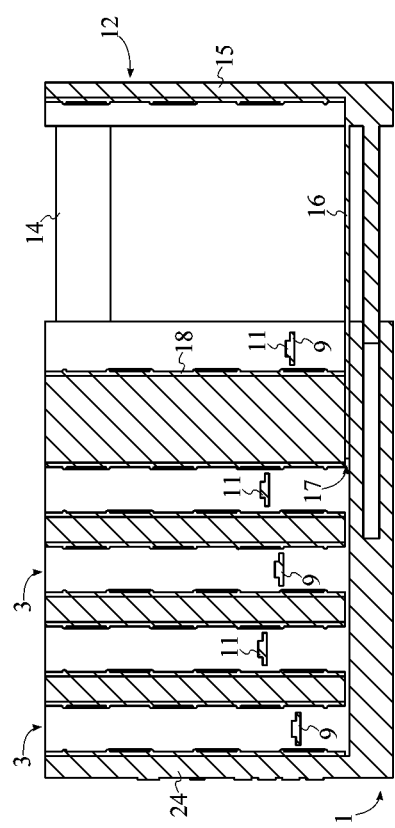
FIG. 5 is a cross-section view of the present invention.
Figure 6:
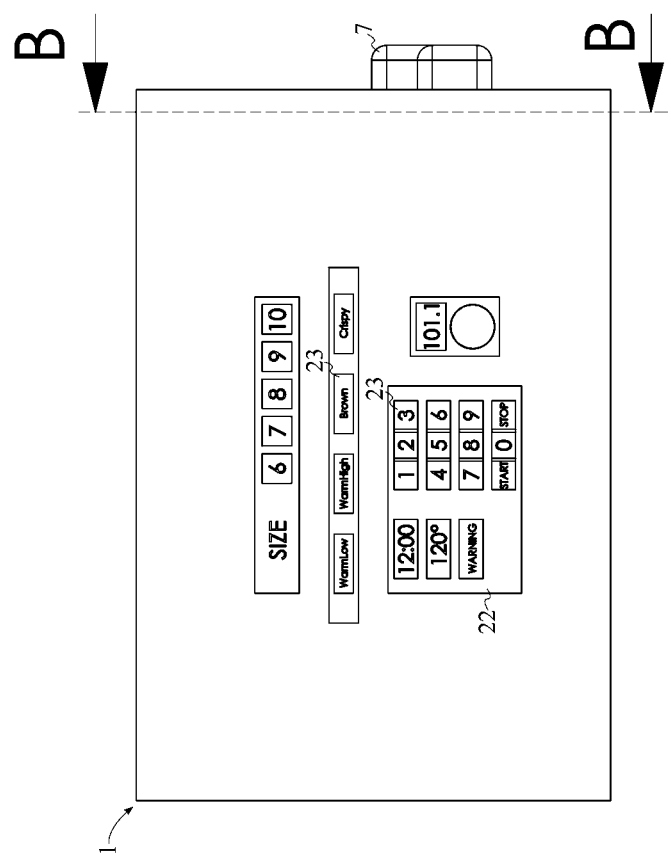
FIG. 6 is a front view of the present invention.
Figure 7:
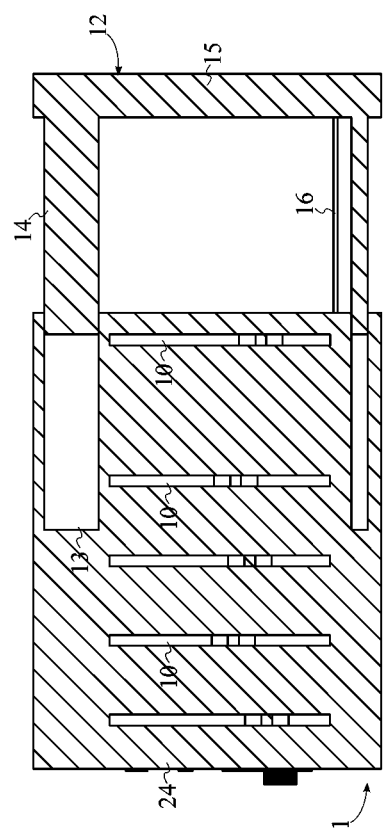
FIG. 7 is an alternative cross-section view of the present invention.

The present invention is a flatbread toaster for toasting flatbread and cooking various other types of food. With reference to FIGS. 1-3, the present invention comprises a toaster 1, a plurality of toasting slot assemblies 2, and an expandable slot assembly 12. The plurality of toasting slot assemblies 2 is designed to toast flatbread while the expandable slot assembly 12 may be utilized to cook additional types of food. Each of the plurality of toasting slot assemblies 2 comprises a toaster slot 3 and a plurality of heating elements 5. The toaster slot 3 is capable of holding the flatbread in place during the process of toasting while the plurality of heating elements 5 provides the level of heat required to toast the flatbread. The plurality of toasting slot assemblies 2 is positioned parallel to each other and is distributed across the toaster 1. The positioning and orientation of the plurality of toasting slot assemblies 2 ensures that there is sufficient space on the toaster 1 when toasting multiple pieces of flatbread. The plurality of heating elements 5 is laterally mounted within the toaster slot 3 in order to ensure that heat is evenly applied to a piece of flatbread within the toaster slot 3. The toaster slot 3 traverses into the toaster 1 in a manner such that a piece of flatbread is contained within the toaster 1 during the toasting process.

With reference to FIGS. 4-7, the expandable slot assembly 12 is positioned parallel to the plurality of toasting slot assemblies 2 in order to ensure sufficient spacing between the plurality of toasting slot assemblies 2 and the expandable slot assembly 12. The expandable slot assembly 12 comprises at least one expansion track 13, at least one expansion rail 14, and a translating wall 15. The at least one expansion track 13 and the at least one expansion rail 14 are utilized to move the translating wall 15 from a compact configuration to an expanded configuration and vice versa. The at least one expansion rail 14 is connected normal to the translating wall 15 while the at least one expansion track 13 traverses into the toaster 1 and is positioned normal and adjacent to the plurality of toasting slot assemblies 2. This allows the at least one expansion rail 14 to be inserted into the at least one expansion track 13 while the present invention is resting on a flat surface. Additionally, because the at least one track 13 is positioned normal and adjacent to the plurality of toasting slot assemblies 2, the at least one expansion track 13 allows the at least one expansion rail 14 to slide along the length of the toaster 1 when the expandable slot assembly 12 is adjusted. The at least one expansion rail 14 is slidably engaged into the at least one expansion track 13 in order to allow the at least one expansion rail 14 to slide along the at least one expansion track 13 when increasing or decreasing the size of the present invention by adjusting the position of the translating wall 15.

The expandable slot assembly 12 further comprises a floor plate 16 and a floor plate track 17. The floor plate 16 is positioned opposite to the at least one expansion rail 14 across the translating wall 15. As such, the floor plate 16 provides a base for any food item(s) placed within the expandable slot assembly 12 between the floor plate 16 and the at least one expansion rail 14 when the present invention is in the compact configuration or the expanded configuration. The floor plate track 17 traverses into the toaster 1 and is positioned normal and adjacent to the plurality of toasting slot assemblies 2. The floor plate 16 is connected perpendicular to the translating wall 15. Similar to the at least one expansion rail 14 and the at least one expansion track 13, the positioning and orientation of the floor plate 16 and the floor plate track 17 allow the floor plate 16 to be inserted into the floor plate track 17 while the present invention is resting on a flat surface. The floor plate 16 is slidably engaged into the floor plate track 17 in order to allow the floor plate 16 to slide within the floor plate track 17. Additionally, the floor plate track 17 allows the floor plate 16 to be contained within the toaster 1 when the present invention is in the compact configuration.

Figure 13:
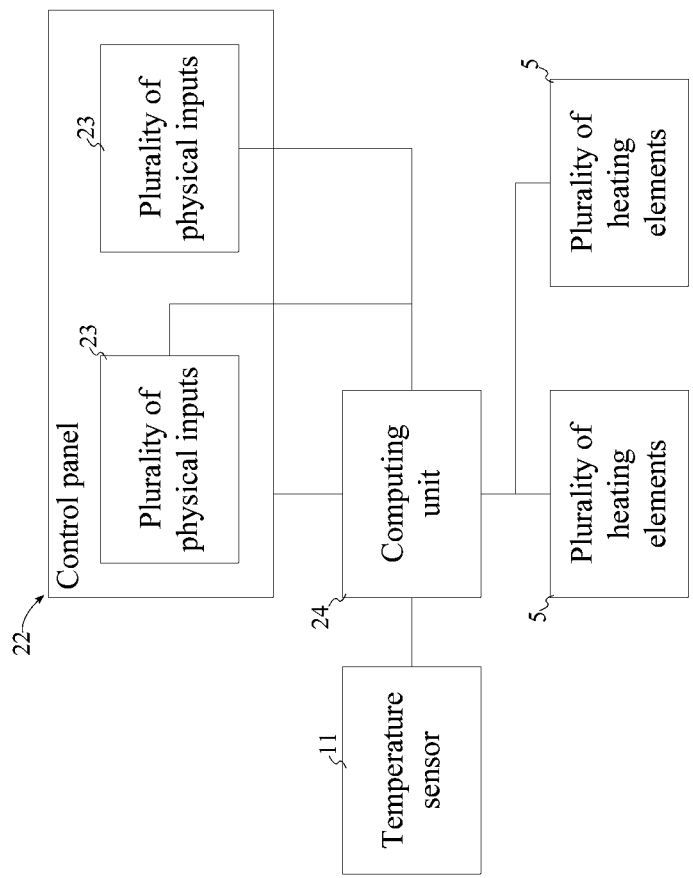
FIG. 13 is a schematic diagram of electronic components of the present invention.
Figure 14:
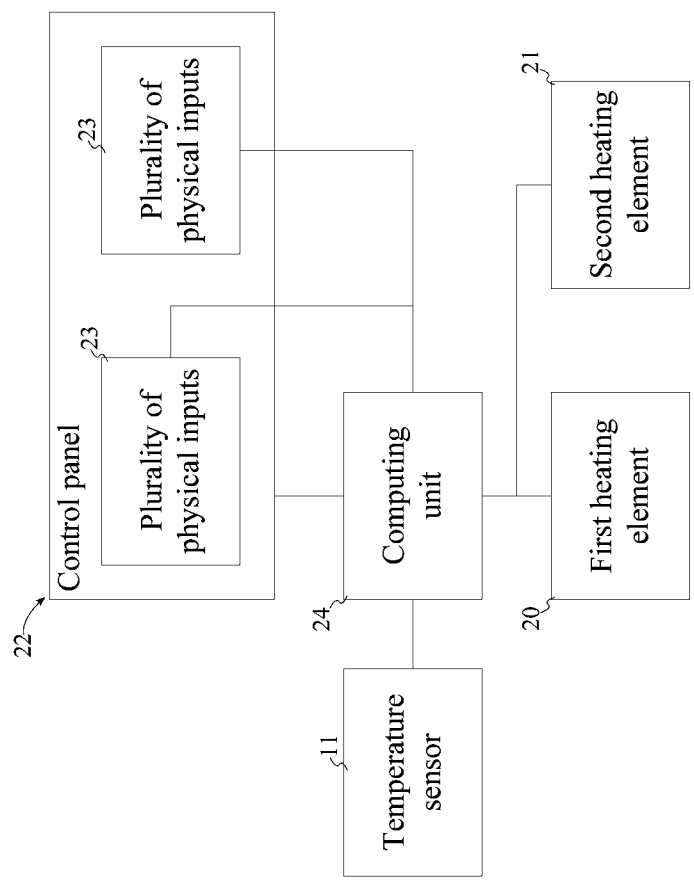
FIG. 14 is an additional schematic diagram of electronic components of the present invention.

Again referring to FIG. 1, the present invention further comprises a control panel 22 and a computing unit 24. The control panel 22 is utilized by the user to specify sizes of flatbread to be toasted, cooking times, and other variables. The control panel 22 comprises a plurality of physical inputs 23 such as, but not limited to, buttons. The plurality of physical inputs 23 may be backlit or similarly illuminated in order to facilitate viewing of the plurality of physical inputs 23. Illumination of the plurality of physical inputs 23 may also provide additional functionality and information such as by notifying the user of which slots of the plurality of toasting slot assemblies 2 and the expandable slot assembly 12 are currently in use. Additionally, the control panel 22 is adjacently mounted to the toaster 1. This places the plurality of physical inputs 23 into a position of convenient access for the user on the exterior of the toaster 1. In the preferred embodiment of the present invention, the plurality of physical inputs 23 comprises buttons to select the size of flatbread being toasted, a start and stop button, buttons to select the slot(s) to be used during toasting, and various cooking options such as "warm low", "warm high", "brown", and "crispy". As shown in FIG. 4-7, the computing unit 24 is enclosed within the toaster 1 to protect the electronic components. As shown in FIG. 13 and FIG. 14, the control panel 22 is electronically connected to the computing unit 24 to allow user commands provided through the control panel 22 to be transmitted to the computing unit 24, where the commands are processed. Each of the plurality of heating elements 5 and the plurality of physical inputs 23 are electronically connected to the computing unit 24. As such, user commands provided through the plurality of physical inputs 23 are transmitted and processed by the computing unit 24. The computing unit 24 is able to process the user commands and regulate the cooking temperature provided by the plurality of heating elements 5.

As shown in FIG. 1 and FIG. 2, the present invention further comprises at least one storage slot 25. The at least one storage slot 25 may be utilized to hold and protect items such as cooking utensils. The at least one storage slot 25 traverses into the toaster 1 in order to house any items placed into the at least one storage slot 25 within the toaster 1. The at least one storage slot 25 is positioned in between the plurality of toasting slot assemblies 2 and the expandable slot assembly 12 and serves to separate the plurality of toasting slot assemblies 2 and the expandable slot assembly 12.

Figure 8:
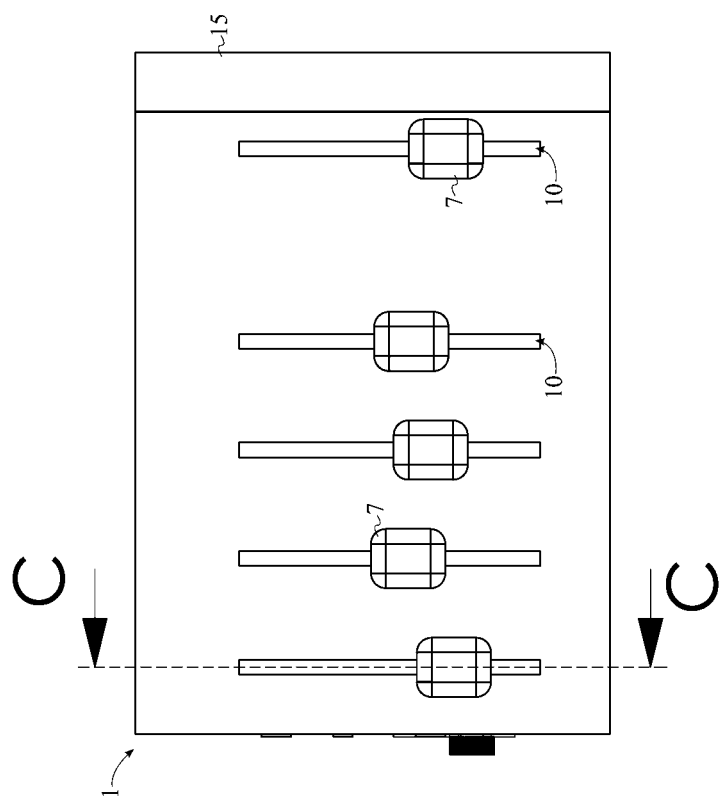
FIG. 8 is a side view of the present invention.
Figure 9:
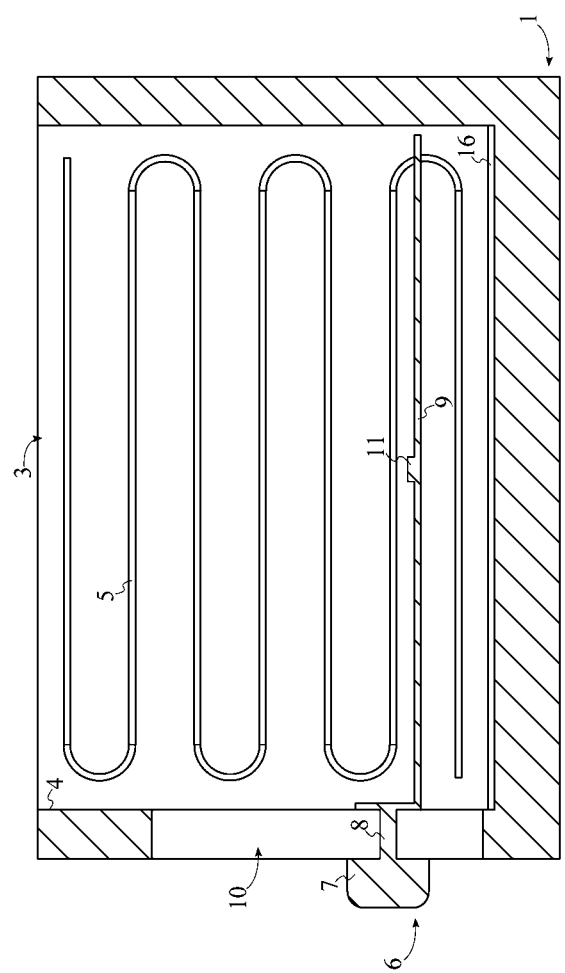
FIG. 9 is a further alternative cross-section view of the present invention.

With reference to FIG. 8 and FIG. 9, each of the plurality of toasting slot assemblies 2 further comprises a spring-loaded raiser 6 and a raiser slot 10. The spring-loaded raiser 6 holds a food item in place during toasting and additionally pops up once the food item has finished cooking in order to facilitate retrieval of the food item by the user. The spring-loaded raiser 6 comprises a lever 7, a slider 8, and a platform 9. The lever 7 is utilized by the user in order to lower or raise the spring-loaded raiser 6. The raiser slot 10 traverses into the toaster 1 to an inner lateral wall 4 of the toaster slot 3. The raiser slot 10 is positioned along the inner lateral wall 4 with the slider 8 slidably engaged along the raiser slot 10. This allows the user to lower or raise the spring-loaded raiser 6 with the slider 8 sliding along the raiser slot 10 during lower or raising. The platform 9 serves as the base on which a food item rests during cooking. The platform 9 is adjacently connected to the slider 8, opposite to the lever 7, allowing the platform 9 to be lowered or raised when the lever 7 is lowered or raised by the user. The platform 9 is positioned within the toaster slot 3 in order to contain a food item within the toaster slot 3 during cooking.

Again referencing FIGS. 1-10, the expandable slot assembly 12 further comprises a stationary wall 18, an expandable toasting slot 19, a spring-loaded raiser 6, and a raiser slot 10. The stationary wall 18 is adjacently integrated into the toaster 1 and, along with the translating wall 15, serves to assist in containing a food item within the expandable slot assembly 12. The expandable toasting slot 19 traverses into the stationary wall 18 and the translating wall 15 and serves to contain a food item between the stationary wall 18 and the translating wall 15. Similar to the spring-loaded raiser 6 of each of the plurality of toasting slot assemblies 2, the spring-loaded raiser 6 of the expandable slot assembly 12 comprises a lever 7, a slider 8, and a platform 9. The spring-loaded raiser 6 serves to lower or raise a food item within the expandable slot assembly 12. The lever 7 is adjacently connected to the slider 8. As such, when the user lowers or raises the lever 7, the slider 8 is lowered or raised as well. The platform 9 is adjacently connected to the slider 8, opposite to the lever 7, allowing the platform 9 to be lowered or raised along with the lever 7. The platform 9 is positioned within the expandable toasting slot 19 and serves as the base on which a food item rests while cooking within the expandable toasting slot 19. The raiser slot 10 traverses into the toaster 1 to an inner lateral wall 4 of the expandable toasting slot 19 with the raiser slot 10 being positioned along the inner lateral wall 4. Additionally, the slider 8 is slidably engaged along the raiser slot 10, allowing the lever 7, the slider 8, and the platform 9 to be lowered or raised along the raiser slot 10 of the expandable slot assembly 12.

The expandable slot assembly 12 further comprises a first heating element 20 and a second heating element 21. The first heating element 20 and the second heating element 21, provide a level of heat required to cook a food item within the expandable toasting slot 19. The first heating element 20 and the second heating element 21 are located within the expandable toasting slot 19 in order to place the first heating element 20 and the second heating element 21 into close proximity with a food item within the expandable toasting slot 19. The first heating element 20 is adjacently connected across the stationary wall 18 while the second heating element 21 is adjacently connected across the translating wall 15. The positioning of the first heating element 20 and the second heating element 21 allow the first heating element 20 and the second heating element 21 to evenly apply heat to a food item within the expandable toasting slot 19. Again with reference to FIG. 13 and FIG. 14, the first heating element 20 and the second heating element 21 are electronically connected to the computing unit 24. As such, user commands provided through the plurality of physical inputs 23 are processed by the computing unit 24 and the computing unit 24 is able to regulate the first heating element 20 and the second heating element 21 accordingly.

As shown in FIG. 3, each toasting slot of the plurality of toasting slots 2 and the expandable toasting assembly 12 further comprise a temperature sensor 11. The temperature sensor 11 is capable of determining the cooking temperature of a piece of flatbread or other food item within the plurality of toasting slot assemblies 2 and the expandable slot assembly 12. Again referring to FIG. 13 and FIG. 14, the temperature sensor 11 of each of the plurality of toasting slot assemblies 2 and the temperature sensor 11 of the expandable slot assembly 12 are electronically connected to the computing unit 24. As such, once the cooking temperature of a piece of flatbread or other food item has reached a predetermined level, the computing unit 24 is able to disengage the plurality of heating elements 5, the first heating element 20, and the second heating element 21. Additionally, the spring-loaded raiser 6 of each of the plurality of toasting slot assemblies 2 and the spring-loaded raiser 6 of the expandable slot assembly 12 are automatically raised upon the desired cooking temperature being reached.

In an embodiment of the present invention, the present invention further comprises a clock module, a radio module, and a plurality of digital displays. In this embodiment, the clock module, the radio module, and the plurality of digital displays are electronically connected to the computing unit 24. The clock module outputs the current time through the plurality of digital displays for convenient viewing by the user. The clock module may also display the remaining time during a toasting or cooking process. The radio module comprises an antenna, a receiver, a speaker, and a means for the user to adjust the radio frequency. In addition to the current/cooking time, the plurality of digital displays is capable of outputting additional information to the user including, but not limited to, the cooking temperature within the plurality of toasting slot assemblies 2 and the expandable slot assembly 12. The plurality of digital displays may additionally comprise a warning display in the event that a piece of flatbread or other food item becomes too hot or combusts. The temperature threshold at which the warning display is activated may be programmed into the computing unit 24.

Figure 10:
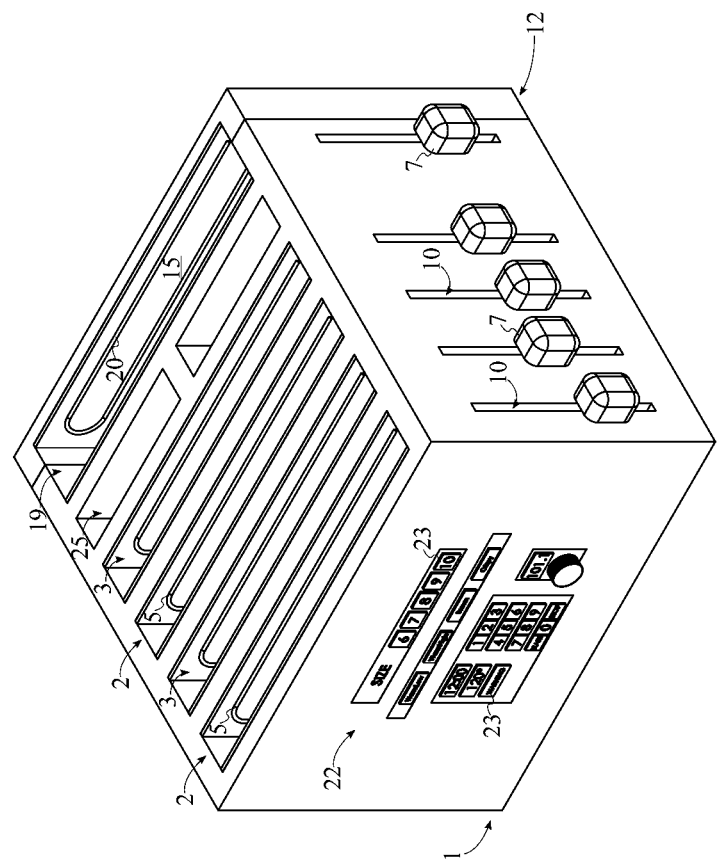
FIG. 10 is a perspective view of the present invention in a compact configuration.

With reference to FIG. 10, the translating wall 15 is in a compact configuration. In the compact configuration of the present invention, the translating wall 15 is positioned adjacent to the stationary wall 18. As such, the compact configuration relates generally to the configuration in which the expandable slot assembly 12 is not expanded. Conversely, with reference to FIG. 1, the translating wall 15 is in an expanded configuration. In the expanded configuration, the translating wall 15 is offset from the stationary wall 18. The distance between the translating wall 15 and the stationary wall 18 may vary in the expanded configuration of the present invention in order to accommodate various sizes of food items.

Figure 11:
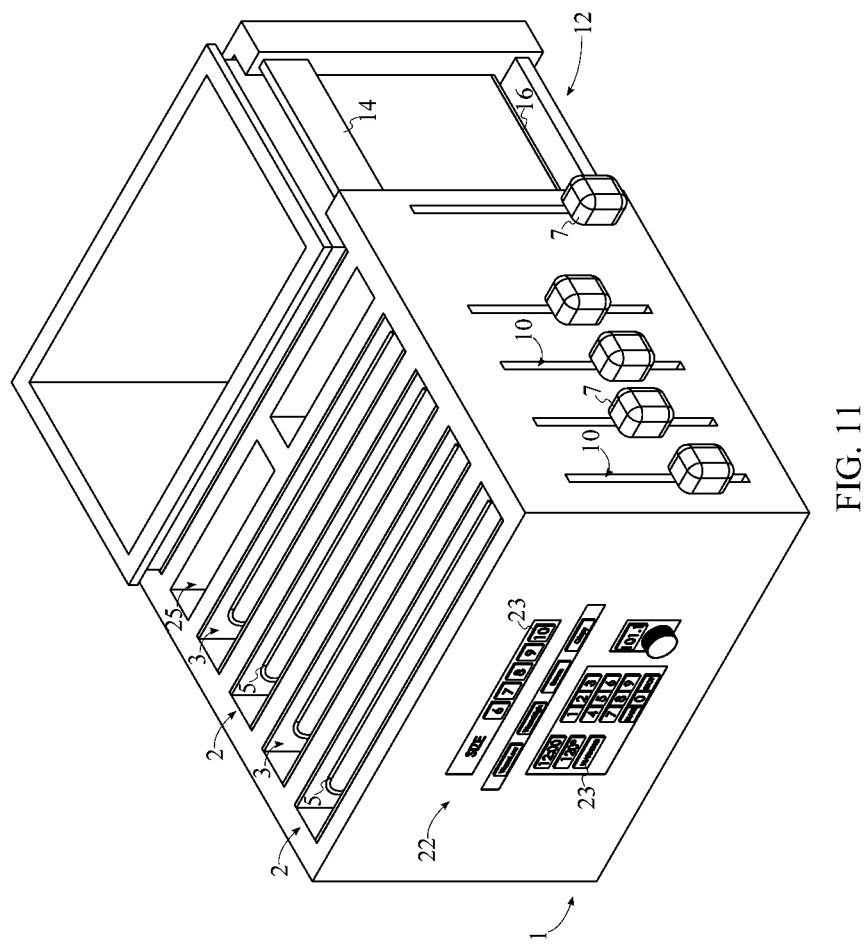
FIG. 11 is a perspective view of the present invention in an expanded configuration with a vessel contained within the expandable slot assembly.

The expandable slot assembly 12 may be utilized to cook various food types in addition to flatbread. For example, with reference to FIG. 11, a pot, tub, or similar vessel may be inserted into the expandable slot assembly 12 in between the translating wall 15 and the stationary wall 18. Water or other liquid (such as soup) may be poured into the vessel in order to heat and/or boil the liquid within.

Figure 12:
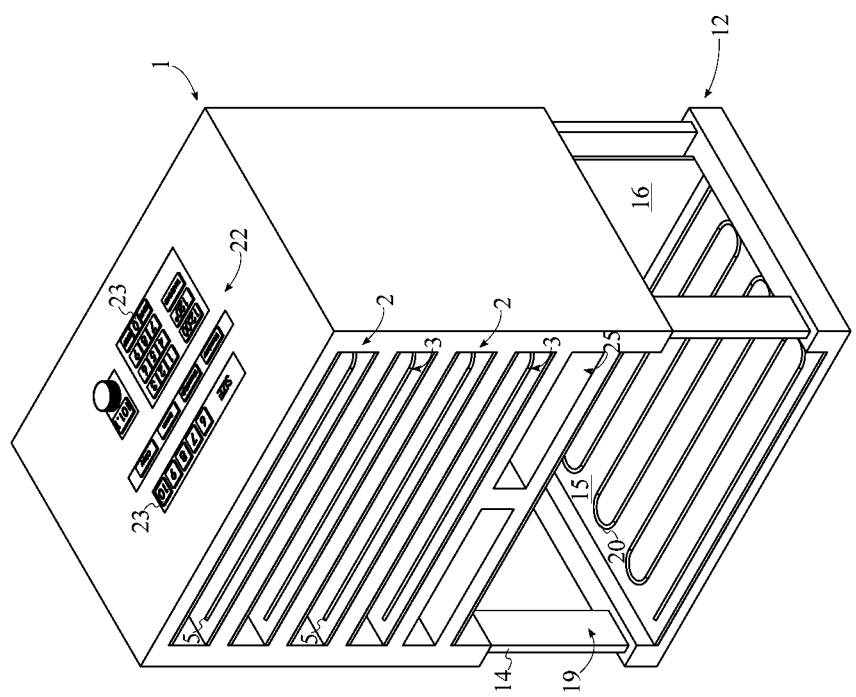
FIG. 12 is a perspective view of the present invention in an alternative orientation and positioning.

When placed on a flat surface, the present invention may be oriented horizontally with respect to the resting surface as shown in FIG. 1. However, the present invention may additionally be oriented vertically as shown in the example in FIG. 12. In this orientation, the present invention is able to serve as an oven in lieu of a toaster.

Although the invention has been explained in relation to its preferred embodiment, it is to be understood that many other possible modifications and variations can be made without departing from the spirit and scope of the invention as hereinafter claimed.

What is claimed is:

1. A flatbread toaster comprises:
   a toaster;
   a plurality of toasting slot assemblies;
   an expandable slot assembly;
   each of the plurality of toasting slot assemblies comprises a toaster slot and a plurality of heating elements;
   the expandable slot assembly comprises at least one expansion track, at least one expansion rail, and a translating wall;
   the plurality of toasting slot assemblies being positioned parallel to each other;
   the plurality of toasting slot assemblies being distributed across the toaster;
   the plurality of heating elements being laterally mounted within the toaster slot;
   the toaster slot traversing into the toaster;
   the expandable slot assembly being positioned parallel to the plurality of toasting slot assemblies;
   the at least one expansion rail being connected normal to the translating wall;
   the at least one expansion track traversing into the toaster and being positioned normal and adjacent to the plurality of toasting slot assemblies; and
   the at least one expansion rail being slidably engaged into the at least one expansion track.

2. The flatbread toaster as claimed in claim 1 further comprises:
   the expandable slot assembly further comprises a floor plate and a floor plate track;
   the floor plate being positioned opposite to the at least one expansion rail across the translating wall;
   the floor plate track traversing into the toaster and being positioned normal and adjacent to the plurality of toasting slot assemblies;
   the floor plate being connected perpendicular to the translating wall; and
   the floor plate being slidably engaged into the floor plate track.

3. The flatbread toaster as claimed in claim 1 further comprises:
   a control panel;
   a computing unit;
   the control panel comprises a plurality of physical inputs;
   the control panel being adjacently mounted to the toaster;
   the computing unit being enclosed within the toaster;
   the control panel being electronically connected to the computing unit; and
   each of the plurality of heating elements and the plurality of physical inputs being electronically connected to the computing unit.

4. The flatbread toaster as claimed in claim 1 further comprises:
   at least one storage slot;
   the at least one storage slot traversing into the toaster; and
   the at least one storage slot being positioned in between the plurality of toasting slot assemblies and the expandable slot assembly.

5. The flatbread toaster as claimed in claim 1 further comprises:
   each of the plurality of toasting slot assemblies further comprises a spring-loaded raiser and a raiser slot;
   the spring-loaded raiser comprises a lever, a slider, and a platform;
   the lever being adjacently connected to the slider;
   the platform being adjacently connected to the slider, opposite to the lever;

the platform being positioned within the toaster slot;

the raiser slot traversing into the toaster to an inner lateral wall of the toaster slot;

the raiser slot being positioned along the inner lateral wall; and the slider being slidably engaged along the raiser slot.

6. The flatbread toaster as claimed in claim 1 further comprises:

the expandable slot assembly further comprises a stationary wall, an expandable toasting slot, a spring-loaded raiser, and a raiser slot;

the spring-loaded raiser comprises a lever, a slider, and a platform;

the stationary wall being adjacently integrated into the toaster;

the lever being adjacently connected to the slider;

the platform being adjacently connected to the slider, opposite to the lever;

the expandable toasting slot traversing into the stationary wall and the translating wall;

the platform being positioned within the expandable toasting slot;

the raiser slot traversing into the toaster to an inner lateral wall of the expandable toasting slot;

the raiser slot being positioned along the inner lateral wall; and the slider being slidably engaged along the raiser slot.

7. The flatbread toaster as claimed in claim 1 further comprises:

the expandable slot assembly further comprises a first heating element, a second heating element, an expandable toasting slot, and a stationary wall;

the stationary wall being adjacently integrated into the toaster;

the expandable toasting slot traversing into the stationary wall and the translating wall;

the first heating element and the second heating element being located within the expandable toasting slot;

the first heating element being adjacently connected across the stationary wall;

the second heating element being adjacently connected across the translating wall; and the first heating element and the second heating element being electronically connected to a computing unit.

8. The flatbread toaster as claimed in claim 1 further comprises:

a computing unit;

each of the plurality of toasting slot assemblies further comprises a temperature sensor; and the temperature sensor being electronically connected to the computing unit.

9. The flatbread toaster as claimed in claim 1 further comprises:

a computing unit;

the expandable slot assembly further comprises a temperature sensor; and the temperature sensor being electronically connected to the computing unit.

10. The flatbread toaster as claimed in claim 1 further comprises:

the translating wall of the expandable slot assembly is in a compact configuration; and the translating wall being positioned adjacent to a stationary wall of the expandable slot assembly.

11. The flatbread toaster as claimed in claim 1 further comprises:

the translating wall of the expandable slot assembly is in an expanded configuration; and the translating wall being offset from a stationary wall of the expandable slot assembly.

12. A flatbread toaster comprises:

a toaster;

a plurality of toasting slot assemblies;

an expandable slot assembly;

a control panel;

a computing unit;

each of the plurality of toasting slot assemblies comprises a toaster slot and a plurality of heating elements;

the expandable slot assembly comprises at least one expansion track, at least one expansion rail, a translating wall, a floor plate, and a floor plate track;

the control panel comprises a plurality of physical inputs;

the plurality of toasting slot assemblies being positioned parallel to each other;

the plurality of toasting slot assemblies being distributed across the toaster;

the plurality of heating elements being laterally mounted within the toaster slot;

the toaster slot traversing into the toaster;

the expandable slot assembly being positioned parallel to the plurality of toasting slot assemblies;

the at least one expansion rail being connected normal to the translating wall;

the at least one expansion track traversing into the toaster and being positioned normal and adjacent to the plurality of toasting slot assemblies;

the at least one expansion rail being slidably engaged into the at least one expansion track;

the floor plate being positioned opposite to the at least one expansion rail across the translating wall;

the floor plate track traversing into the toaster and being positioned normal and adjacent to the plurality of toasting slot assemblies;

the floor plate being connected perpendicular to the translating wall;

the floor plate being slidably engaged into the floor plate track;

the control panel being adjacently mounted to the toaster;

the computing unit being enclosed within the toaster;

the control panel being electronically connected to the computing unit; and each of the plurality of heating elements and the plurality of physical inputs being electronically connected to the computing unit.

13. The flatbread toaster as claimed in claim 12 further comprises:

at least one storage slot;

the at least one storage slot traversing into the toaster; and the at least one storage slot being positioned in between the plurality of toasting slot assemblies and the expandable slot assembly.

14. The flatbread toaster as claimed in claim 12 further comprises:

each of the plurality of toasting slot assemblies further comprises a spring-loaded raiser and a raiser slot;

the spring-loaded raiser comprises a lever, a slider, and a platform;

the lever being adjacently connected to the slider;

the platform being adjacently connected to the slider, opposite to the lever;

the platform being positioned within the toaster slot;

the raiser slot traversing into the toaster to an inner lateral wall of the toaster slot;

the raiser slot being positioned along the inner lateral wall; and the slider being slidably engaged along the raiser slot.

15. The flatbread toaster as claimed in claim 12 further comprises:

the expandable slot assembly further comprises a stationary wall, an expandable toasting slot, a spring-loaded raiser, and a raiser slot;

the spring-loaded raiser comprises a lever, a slider, and a platform;

the stationary wall being adjacently integrated into the toaster;

the lever being adjacently connected to the slider;

the platform being adjacently connected to the slider, opposite to the lever;

the expandable toasting slot traversing into the stationary wall and the translating wall;

the platform being positioned within the expandable toasting slot;

the raiser slot traversing into the toaster to an inner lateral wall of the expandable toasting slot;

the raiser slot being positioned along the inner lateral wall; and the slider being slidably engaged along the raiser slot.

16. The flatbread toaster as claimed in claim 12 further comprises:

the expandable slot assembly further comprises a first heating element, a second heating element, an expandable toasting slot, and a stationary wall;

the stationary wall being adjacently integrated into the toaster;

the expandable toasting slot traversing into the stationary wall and the translating wall;

the first heating element and the second heating element being located within the expandable toasting slot;

the first heating element being adjacently connected across the stationary wall;

the second heating element being adjacently connected across the translating wall; and the first heating element and the second heating element being electronically connected to a computing unit.

17. The flatbread toaster as claimed in claim 12 further comprises:

each of the plurality of toasting slot assemblies further comprises a temperature sensor; and the temperature sensor being electronically connected to the computing unit.

18. The flatbread toaster as claimed in claim 12 further comprises:

the expandable slot assembly further comprises a temperature sensor; and the temperature sensor being electronically connected to the computing unit.

19. The flatbread toaster as claimed in claim 12 further comprises:

the translating wall of the expandable slot assembly is in a compact configuration; and the translating wall being positioned adjacent to a stationary wall of the expandable slot assembly.

20. The flatbread toaster as claimed in claim 12 further comprises:

the translating wall of the expandable slot assembly is in an expanded configuration; and the translating wall being offset from a stationary wall of the expandable slot assembly.

* * * * *